March 14, 1944. J. MALCZEWSKI 2,344,444
CONSTRUCTION OF TURBOMACHINES
Filed Sept. 26, 1941
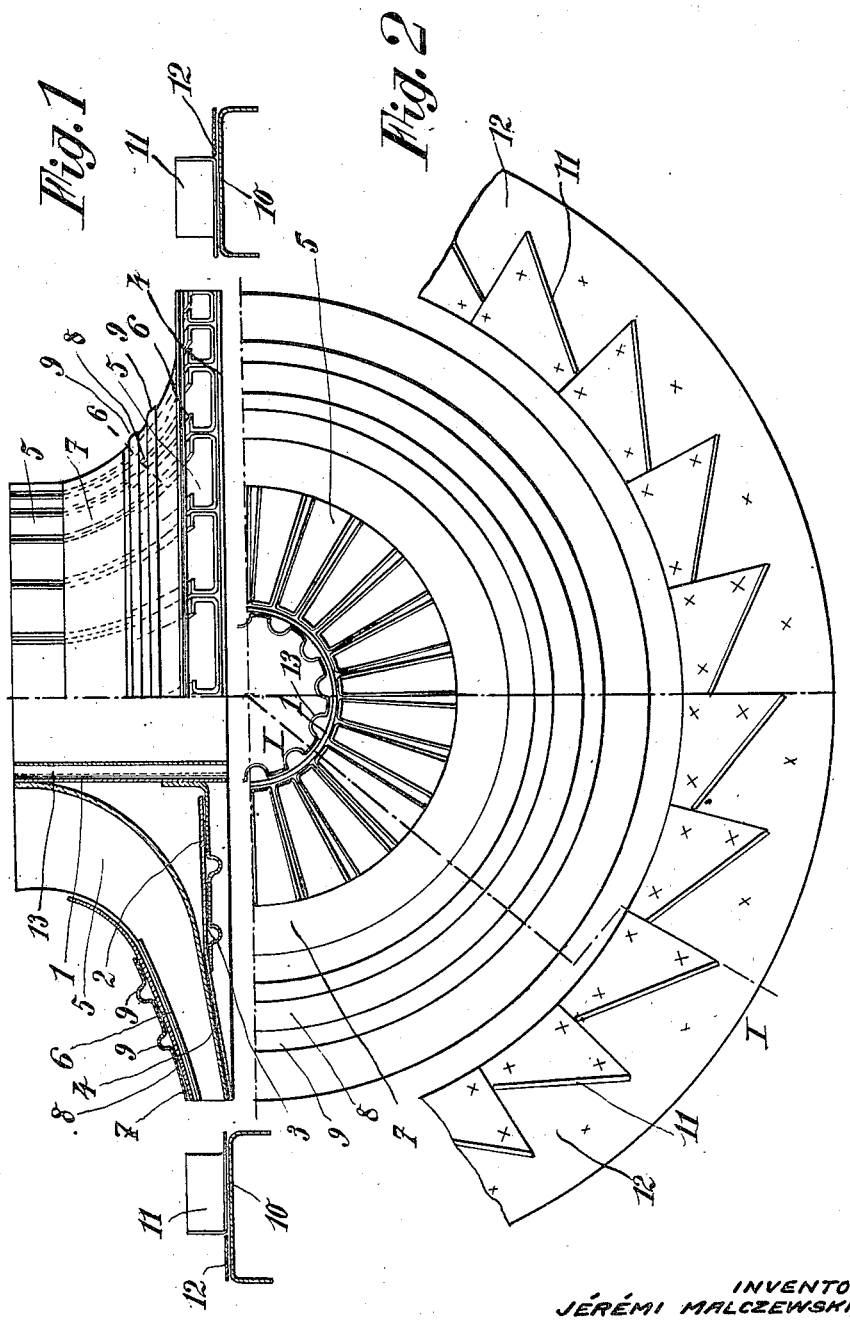
INVENTOR
JÉRÉMI MALCZEWSKI,
BY Robert B Pearson
ATTORNEY Patented Mar. 14, 1944

2,344,444

UNITED STATES PATENT OFFICE 2,344,444

CONSTRUCTION OF TURBOMACHINES

Jérémi Malczewski, Lyon, France; vested in the Alien Property Custodian

Application September 26, 1941, Serial No. 412,528
In France March 29, 1940

7 Claims. (Cl. 230—134)

The present invention relates to the construction of turbo-machines, such as turbo-compressors, turbines and the like, and it is more especially concerned, among these machines, with compressors for airplane engines.

The chief object of the present invention is to provide a machine of the type above mentioned which is better adapted to meet the requirements of practice, and, in particular, which is simpler and less expensive to manufacture than those made up to the present time, while being more efficient.

According to an essential feature of the invention, the rotor and/or the stator of such a machine is constructed of a plurality of metal sheet elements, suitably cut and stamped, and assembled together by electric welding, and preferably, by spot welding.

Other features of the present invention will result from the following detailed description of some specific embodiments thereof.

Preferred embodiments of the present invention will be hereinafter described, with reference to the accompanying drawing, given merely by way of example, and in which:

Fig. 1 diagrammatically shows, in elevation and partly in axial section on the line I—I of Fig. 2, a turbo-compressor made according to the present invention;

Fig. 2 is a half-plan view, with parts cut off, corresponding to Fig. 1.

The turbo-compressor which will now be described with reference to the accompanying drawing is supposed to be intended for use on an airplane engine.

The rotor of this compressor includes a central cylindrical sleeve 1, on which is welded, close to one of the ends thereof, a flange or disc 2, provided with circular ribs 3 which increase the rigidity thereof and constitute baffles capable of preventing leakage of fluid along the surfaces of junction with fixed parts of the compressor.

On flange or disc 2, I secure, by electric welding, for instance as by spot welding, an annular element 4, formed from a thin sheet of metal, preferably manufactured of high resistance steel, the electric welding being performed with electrodes having active surfaces which are active or different, concerning their area and their shape, which makes it possible to obtain an assembly of the pieces without deformation and without regeneration of the welded metal.

Around the central sleeve 1, I distribute, in a regular manner, contiguous vanes, advantageously constructed of stainless and perfectly polished steel, each of these vanes being advantageously made of a box-like element 5, of U-shaped cross section, obtained by cutting and stamping a metal sheet.

Each of these vanes is fixed on annular part 4 in such manner that the curvilinear bottom of the vane can be fixed as by electric spot welding on the central sleeve and on the annular part 4.

Since the vane is constructed of a box-like element 5 of U-shaped cross section, the upper edges of the sides of the U may be bent inwardly in such manner as to form supports 6 for an annular element 7, made of one or several parts, which covers the outer end of the vanes and is fixed thereto, and more especially to supporting portions 6 by electric welding. This annular element 7 is covered with an assembly annular element 8 which is provided with one or more circular ribs or ridges 9 adapted to increase the rigidity of the whole device.

On the inner face of the central sleeve 1, I provide means adapted to permit of driving the rotor.

These means may be made in any suitable manner, but preferably, according to the embodiment illustrated by the drawing, they are constituted by elastic ribs 13 of semi-circular transverse section, obtained by winding about a cylinder a thin metal sheet provided with suitable corrugations, either regular or not, the cylindrical piece thus obtained being connected, for instance by welding, to the inner wall of the central sleeve or shaft 1 of the rotor.

Concerning the stator of the compressor, it may be constructed in any suitable manner and, for instance, in the usual manner.

However, I prefer to make it of a construction analogous to that above described with reference to the rotor, so that said stator is made of a plurality of stamped metal sheet elements assembled by electric welding, these elements being preferably made of stainless steel and being perfectly polished.

By way of example, as shown in the drawing, I mount on an annular support 10, a plurality of vanes 11. The support is constructed of a stamped piece, of U-shaped cross section. It is of course stationary. As for the blades 11, they are made of metal sheet elements bent at right angles and spot welded to the support in their proper positions.

Furthermore, it is advantageous to fix on the upper face of support 10 one or several pieces 12 made of a thickness corresponding to that of the metal sheet elements which constitute the stationary vanes 11. These pieces 12 are cut off in such manner that their outer edge is circular and coincides substantially with the outer edge of support 10, while their inner edge is in the form of saw teeth so as to coincide substantially with the outline of the lower part of stationary vanes 11. With such an arrangement, the surface which carries the fixed vanes is wholly plane and without projections, which considerably increases the efficiency of the compressor.

The compressor thus constituted is completed by a stationary envelope, inlet and exhaust conduits for the fluid to be compressed and means for driving the rotor.

Whatever be the particular detail arrangement that is chosen, I obtain a compressor the operation of which results sufficiently clearly from the preceding explanations for making it unnecessary to enter into further description thereof. Such a compressor complies with the conditions above stated, and the chief elements thereof, to wit the rotor and the stator, can be constructed in an economic manner, contrary to what took place up to now for similar devices, which were made of steel or light alloy pieces, obtained by stamping and machining.

In a general manner, while I have, in the above description, disclosed what I deem to be practical and efficient embodiments of the present invention, it should be well understood that I do not wish to be limited thereto as changes may be made in the arrangement, disposition and form of the parts without departing from the principle of the present invention as comprehended within the scope of the appended claims.

What I claim is:

1. A rotor for a turbo-machine of the type described which comprises, in combination, a cylindrical central sleeve, an annular flange plate secured to said sleeve adjacent one of the ends thereof, circular ridges on said flange plate, and a plurality of vanes carried by said central sleeve, each of said vanes comprising a box-like structure substantially U-shaped in cross section, said vanes being secured to said central sleeve and to said annular flange plate along the bottom of the U.

2. A rotor for a turbo-machine of the type described, which comprises, in combination, a cylindrical central sleeve, an annular flange plate secured to said sleeve adjacent one of the ends thereof, and a plurality of vanes carried by said central sleeve, each of said vanes comprising a box-like element substantially U-shaped in cross section, said element comprised of a stamped metal sheet element which is secured to said central sleeve and to said annular flange plate along the bottom of the U applied against a generatrix of said central sleeve.

3. A rotor for a turbo-machine of the type described which comprises, in combination, a cylindrical central sleeve, an annular flange plate secured adjacent one of the ends of said sleeve, an annular sheet element secured to said flange plate, and a plurality of vanes, each consisting of a box-like structure of general U-shaped cross section, secured both to said central sleeve and to said annular element along the bottom of the U.

4. A rotor for a turbo-machine of the type described, which comprises, in combination, a cylindrical central sleeve, an annular flange plate secured adjacent one of the ends of said sleeve, an annular sheet element secured to said flange plate, a plurality of vanes each of which comprises a box-like structure substantially U-shaped in cross section, said vanes being secured both to said central sleeve and to said annular element along the bottom of the U, the edges of each vane being bent inwardly so as to form supports, and an annular sheet metal element secured to said supports so as to cover a portion of the vanes.

5. A rotor for a turbo-machine of the type described, which comprises, in combination, a cylindrical central sleeve, an annular flange plate secured adjacent one of the ends of said sleeve, a plurality of vanes each of which comprise a box-like element of substantially U-shaped in cross section, said vanes being formed from a stamped metal sheet element and being secured to said central sleeve and to said annular flange plate along the bottom of the U, the edges of each U-shaped element being bent inwardly so as to form supports, and an annular sheet metal element secured to said supports so as to cover a portion of the vanes.

6. A rotor for a turbo-machine of the type described, which comprises, in combination, a cylindrical central sleeve, an annular flange plate element secured adjacent one of the ends of said sleeve, an annular sheet element secured to said flange plate a plurality of vanes each of which comprises a box-like element substantially U-shaped in cross section formed from a stamped metal sheet and secured both to said central sleeve and to said annular sheet element along the bottom of the U, the edges of each vane being bent inwardly and adapted to form supports, and an annular sheet metal element secured to said supports so as to cover a portion of the vanes.

7. A stator for a turbo-machine of the type described, which comprises, in combination, an annular support comprising a stamped metal sheet substantially U-shaped in cross section, a plurality of vanes carried by said support, said vanes comprising metal sheet elements bent at right angles to produce ears which are secured to said support, and a metal sheet element of the same thickness as the ears, secured to said support on the same side thereof as said ears, to cover such of said side as is not covered by said ears.

JÉRÉMI MALCZEWSKI.